United States Patent [19]

Warren, Jr.

[11] Patent Number: 5,390,438
[45] Date of Patent: Feb. 21, 1995

[54] ARM SUPPORT FOR FISHING ROD

[76] Inventor: Alan M. Warren, Jr., 118 Country Club Dr., Benton, La. 71006

[21] Appl. No.: 199,754

[22] Filed: Feb. 22, 1994

[51] Int. Cl.6 ............................................. A01K 87/00
[52] U.S. Cl. ........................................ 43/23; 43/21.2; 248/118
[58] Field of Search ................. 43/21.2, 23, 25; 248/118

[56] References Cited

U.S. PATENT DOCUMENTS

| | | | |
|---|---|---|---|
| 2,149,837 | 3/1939 | Browne | 43/23 |
| 2,212,212 | 8/1940 | Planitz | 224/922 |
| 2,699,622 | 1/1955 | Stevens | 43/23 |
| 3,269,049 | 8/1966 | Emmons | 43/23 |
| 3,367,056 | 2/1968 | Johnson | 224/922 |
| 3,372,509 | 3/1968 | Arsenault | 43/25 |
| 5,197,218 | 3/1993 | Legand | 43/23 |
| 5,313,735 | 5/1994 | Latouche | 43/23 |

Primary Examiner—Kurt Rowan
Assistant Examiner—James Miner
Attorney, Agent, or Firm—John M. Harrison

[57] ABSTRACT

An arm support for stabilizing a fishing rod on a fisherman's arm when lures are retrieved and fish are hooked and played. In a preferred embodiment the arm support is characterized by a rod having a straight portion mounted on the fishing rod handle and a curved portion extending from the straight portion. The straight portion protrudes rearwardly from fixed or removable attachment to the handle of the fishing rod and the curved portion fits beneath the fisherman's forearm, supporting the fisherman's wrist against the weight and playing force of the fish. In another embodiment a reel seat and fishing rod connecting threads are provided on the straight portion of the arm support for receiving a reel and mounting the arm support on a fishing rod, respectively.

14 Claims, 1 Drawing Sheet

U.S. Patent     Feb. 21, 1995     5,390,438
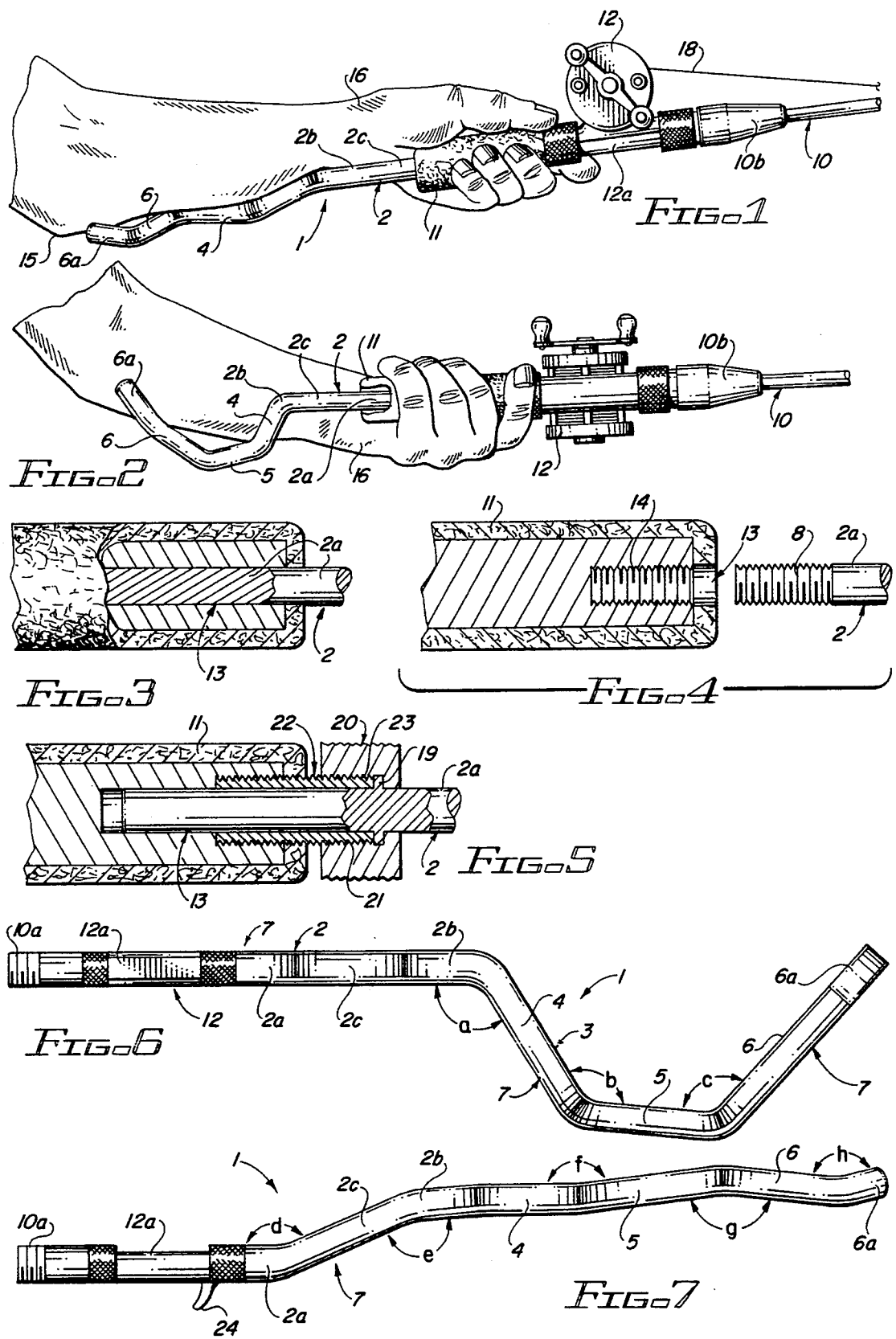

ARM SUPPORT FOR FISHING ROD

BACKGROUND OF THE INVENTION

FIELD OF THE INVENTION

This invention relates to fishing rods and more particularly, to an arm support for stabilizing a fishing rod on a fisherman's arm and preventing the fisherman's wrist from becoming fatigued when lures are retrieved and fish are hooked and played. In a preferred embodiment the arm support is characterized by a relatively stiff, yet somewhat resilient rod having a straight portion and a hook-shaped, curved portion defined by multiple rod segments extending from one another in angular relationship. The straight portion of the arm support protrudes from the handle of the fishing rod and the curved portion is shaped to fit beneath the wrist and forearm of the fisherman, such that the forearm spans the distance between the two transverse legs of the curved portion. Alternatively, the straight portion of the arm support can be fitted with a reel seat, finger grip or flange and connecting threads for attaching a fishing rod to the arm support.

One of the problems encountered in retrieving lures and playing large fish such as catfish, bass and the like on the end of a fishing line using a rod and reel is the constant pressure which the fishing rod exerts on the fisherman's wrist. This pressure results in rapid arm and wrist fatigue and detracts from the pleasure of fishing, as well as increases the possibility of inadvertently dropping the fishing rod into the water due to such fatigue. The arm support of this invention is designed to be either permanently built into the handle of the fishing rod, removably threaded into a pre-threaded socket or nipple located in or on the handle or fitted with a reel seat and connecting threads for mounting on a fishing rod. The fisherman grips the fishing rod handle and when a fish is played on the end of the fishing line, the curved portion of the arm support located under the fisherman's forearm, exerts pressure upwardly against the forearm, instead of on the wrist, thereby relieving pressure on the fisherman's wrist. Accordingly, it is an object of this invention to provide an arm support for mounting in the handle of a fishing rod and stabilizing the fishing rod on the arm of a fisherman.

Another object of this invention is to provide an arm support extending from the handles of fishing rods for removing from a fisherman's wrist excess pressure exerted by the weight of a hooked fish, which arm support is characterized by a relatively stiff rod having a straight rod portion or segment for fixed or removable attachment to the fishing rod handle and a generally C-shaped curved rod portion which includes multiple rod segments linearly extending from one another in selected angular relationship and positioned beneath the fisherman's forearm to exert pressure upwardly against the fisherman's forearm when lures are retrieved and fish are hooked and played on the fishing line and rod.

A further object of this invention is to provide an arm support which may be removably threaded in a pre-threaded socket located in the handle end of a fishing rod to support the wrist of a fisherman when the fisherman is retrieving lures and playing fish and the fish and lures are exerting pressure on the end of the rod.

A still further object of this invention is to provide a fishing rod arm support characterized by an elongated rod segment extending from the rod handle and a curved rod portion extending from the elongated rod portion for positioning under the forearm of a fisherman, the straight rod portion including a flange-mounted, cylindrical nut provided with interior threads for removably engaging external threads on a nipple which protrudes rearwardly from the handle of a fishing rod and slidably receives the straight rod portion, to removably mount the arm support on the fishing rod handle.

Another object of the invention is to provide an arm support which is equipped with a reel seat and rod mount connection for receiving and mounting a reel and a fishing rod, which arm support further includes a curved segment extending from the reel seat for supporting the forearm while the fisherman retrieves lures and plays hooked fish.

SUMMARY OF THE INVENTION

These and other objects of the invention are provided in an arm support for stabilizing a fishing rod on the arm of a fisherman and for removing at least some of the playing pressure of a fish or heavy lures from the fisherman's wrist while the fisherman is playing the fish on a fishing line extending from a reel mounted on the fishing rod, which arm support is characterized by an elongated straight portion which protrudes rearwardly from fixed or removable attachment to the handle of the fishing rod and a generally C-shaped curved portion which is characterized by multiple, short, straight rod segments connected in selected angular relationship with respect to one another and with respect to the straight portion and shaped to fit beneath the forearm of the fisherman. One end of the curved portion is positioned under the fisherman's wrist and the other end is located under his or her forearm near the elbow, such that the curved portion exerts pressure upwardly against the fisherman's wrist and forearm responsive to lure retrieval and the playing pressure and weight of fish on the end of the fishing line.

BRIEF DESCRIPTION OF THE DRAWING

The invention will be better understood by reference to the accompanying drawing, wherein:

FIG. 1 is a perspective view of a preferred embodiment of the arm support for a fishing rod mounted in the handle of a fishing rod;

FIG. 2 is a bottom view of the arm support illustrated in FIG. 1;

FIG. 3 is a side sectional view of the handle of a fishing rod, more particularly detailing a preferred technique for fixedly mounting the arm support in the fishing rod handle;

FIG. 4 is a side sectional view of the handle of a fishing rod, more particularly detailing a threaded technique for removably mounting the arm support in the fishing rod handle;

FIG. 5 is a side sectional view of the handle of a fishing rod, more particularly detailing an alternative inserted nipple and coupling technique for removably mounting the arm support in the handle;

FIG. 6 is a top view of an alternative preferred embodiment of the arm support for a fishing rod and wherein a reel seat and fishing rod connecting threads are built into the arm support; and FIG. 7 is a side view of the embodiment illustrated in FIG. 6.

DESCRIPTION OF THE PREFERRED EMBODIMENTS

Referring initially to FIGS. 6 and 7 of the drawing, in a preferred embodiment the arm support for a fishing rod of this invention is generally illustrated by reference numeral 1. The arm support 1 is characterized by tube or rod 7 which is constructed of a substantially rigid, but preferably slightly resilient plastic or metal such as aluminum, and includes a straight rod portion 2, having a reel seat 12a and fishing rod connecting threads 10a, and a generally C-shaped curved rod portion 3. The straight rod portion 2 includes a distal section 2a, a proximal section 2b and a middle section 2c, located between the distal section 2a and proximal section 2b. Accordingly, the arm support 1 is equipped to receive a conventional fishing rod 10, as hereinafter described. However, in a most preferred embodiment the fishing rod 10 extends into a bore provided in the reel seat 12a of the rod 7 through the distal section 2a and is permanently secured therein.

Referring now to FIGS. 1, 2, 6 and 7, the reel seat 12a of a conventional fishing reel handle 11 accommodates and mounts a reel 12 and a fishing rod 10 can be mounted on the end of the reel handle 11 forward of the reel seat 12a (as well as on the straight rod portion 2 illustrated in FIGS. 6 and 7), by means of the fishing rod connection threads 10a and the fishing rod connecting nut 10b. The curved rod portion 3 of the arm support 1 includes a first rod segment 4, which is continuous with the proximal section 2b of the straight rod portion 2. While the entire straight rod portion 2 and curved rod portion 3 may lie in a common plane, in a most preferred embodiment, both the straight rod portion 2 and the curved rod portion 3 may have angled segments to better conform the arm support 1 to the arm of a fisherman, as hereinafter described. The axis of the first rod segment 4 of the curved rod portion 3 is disposed at an angle (a) of from about 110 to about 130 degrees and preferably, about 120 degrees, with respect to the axis of the straight rod portion 2. A second rod segment 5, continuous with the end of the first rod segment 4, is disposed at an angle (b) of from about 116 to about 136 degrees and preferably, about 126 degrees, with respect to the first rod segment 4. A third rod segment 6, terminating in a distal end 6a, is continuous with the end of the second rod segment 5 and is disposed at an angle (c) of from about 118 to about 138 degrees and preferably, about 128 degrees with respect to the second rod segment 5.

Referring again to FIG. 7 of the drawing, a finger grip 24 for finger-gripping the arm support 1, extends downwardly from the bottom surface of the reel seat 12a, provided in the straight rod portion 2 at the distal section 2a. The middle section 2c of the straight rod portion 2 extends upwardly from the end of the distal section 2a, defining an angle (d) of from about 143 to about 163 degrees and preferably, about 153 degrees between the axis of the middle section 2c and the axis of the distal section 2a. The proximal section 2b extends downwardly from the end of the middle section 2c, defining an angle (e) of from about 150 to about 170 degrees and preferably, about 160 degrees between the axis of the proximal section 2b and the axis of the middle section 2c. The first rod segment 4 is substantially colinear with the proximal section 2b. The second rod segment 5 extends upwardly from the end of the first rod segment 4, defining an angle (f) of from about 167 to about 187 degrees and preferably, about 177 degrees between the axis of the second rod segment 5 and the axis of the first rod segment 4. The third rod segment 6 extends downwardly from the end of the second rod segment 5, defining an angle (g) of from about 164 degrees to about 184 degrees and preferably, about 174 degrees between the axis of the third rod segment 6 and the axis of the second rod segment 5. Finally, the distal end 6a of the third rod segment 6 angles upwardly from the end of the third rod segment 6, defining an angle (h) of from about 155 degrees to about 175 degrees, and preferably, about 165 degrees between the axis of the distal end 6a and the axis of the third rod segment 6.

Referring now to FIGS. 1-3 of the drawing, in another preferred embodiment of the invention the arm support 1 is fixedly mounted in the handle 11 and extends through the reel seat 12a attached or permanently secured to a conventional fishing rod 10, which handle 11 is fitted with a reel 12. A handle bore or cavity 13, centrally and longitudinally provided in the handle 11, receives the distal section 2a of the straight rod portion 2 of the arm support 1, typically secured in the handle cavity 13 using epoxy glue (not illustrated) or other techniques well known to those skilled in the art. The arm support 1 extends rearwardly from the handle 11 and a fisherman normally grips the handle 11 such that the distal section 2a and middle section 2c of the straight rod portion 2 is located under the fisherman's wrist 16, as illustrated in FIGS. 1 and 2. The first rod segment 4 and third rod segment 6 traverse the fisherman's forearm in spaced relationship with respect to each other and the distal end 6a of the third rod segment 6 terminates in front of the fisherman's elbow 15. When a fish (not illustrated) is caught and played on the end of the fishing line 18, wound on the reel 12 mounted on the fishing rod handle 11, the force of the weight and playing pressure of the fish is transmitted down the fishing rod 10, such that the handle 11 is urged upwardly. Consequently, the first rod segment 4 and third rod segment 6 exert pressure upwardly on the fisherman's forearm, reducing the degree of wrist-flexing required for the fisherman to maintain the fishing rod 10 in a desired angular orientation with respect to the horizontal and prevent the fishing rod 10 from being inadvertently pulled from the fisherman's hand. This respective angles (a), (b), (c), (d), (e), (f), (g) and (h) allow the components of the arm support 1 to better fit the contour of the fisherman's arm and may therefore vary, depending upon the size and shape of the fisherman's arm.

Referring now to FIGS. 1, 2 and 4 of the drawing, in another preferred embodiment of the invention the arm support 1 is removably mounted in the handle 11 and extends into the reel seat 12a. Multiple internal handle threads 14 are provided in the interior wall of a handle bore or cavity 13 centrally and longitudinally disposed in the distal end of the fishing rod handle 11. The handle cavity 13 receives the straight rod portion 2, and the arm support threads 8, provided on the exterior surface of the distal section 2a of the straight rod portion 2, engage the handle threads 14 as the arm support 1 is rotated in a clockwise direction, to removably secure the arm support 1 in the fishing rod handle 11. Accordingly, the arm support 1 is removed from the handle 11 by rotating the arm support 1 in a counterclockwise direction, thereby disengaging the arm support threads 8 from the handle threads 14.

Referring finally to FIGS. 1, 2 and 5 of the drawing, in still another preferred embodiment of the invention, a cylindrical rod coupling 20, provided with interior flange threads 21, is mounted on the distal section 2a of the straight rod portion 2 against a fixed rod flange 19. A hollow nipple 22, provided with exterior nipple threads 23, protrudes rearwardly from fixed attachment in a handle cavity 13, centrally and longitudinally disposed in the handle 11 of the fishing rod 10. The arm support 1 is removably attached to the handle 11 by sliding the distal section 2a through the bore (not illustrated) of the mount tube 22 and into the handle cavity 13, such that the nipple 22 threadably receives the coupling 20. As the rod coupling 20 is tightened on the nipple 22, the rod coupling threads 21 successively engage the nipple threads 23 and the straight rod portion 2 is forced farther into the handle cavity 13 until the rod coupling 20 securely seats on the rod flange 19 and secures the arm support 1 to the end of the fishing rod handle 11. The arm support 1 is easily removed from the handle 11 by rotating the rod coupling 20 in the reverse direction, disengaging the rod coupling threads 21 from the nipple threads 22 and removing the straight rod portion 2 from the handle cavity 13 and bore of the mount tube 22.

It will be appreciated by those skilled in the art that the simple construction of the arm support 1 makes it an exceptionally durable and easy-to-use device. The rod 7 of the arm support 1 may be constructed of virtually any inflexible and non-breakable material, including fiberglass, plastic, metal and the like. It is understood that the curved rod portion 3 may be constructed in a semicircular or circular configuration, or any other configuration which may be suitable for engaging the bottom surface of the fisherman's forearm to effectively remove most of the playing pressure of a fish from the fisherman's wrist 16.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An arm support for stabilizing a fishing rod having a handle on the arm of a fisherman, comprising a rod for mounting on the handle of the fishing rod and positioning under the forearm of the fisherman, said rod including a straight rod portion for mounting on the handle of a fishing rod and a first rod segment extending from said straight rod portion and disposed at an angle of about 110 to about 130 degrees with respect to a vertical plane extending longitudinally through said straight rod portion, a second rod segment extending from said first rod segment and disposed at an angle from about 116 to about 136 degrees with respect to a vertical plane extending longitudinally through said first rod segment and a third rod segment extending from said second rod segment and disposed at an angle of from about 118 to about 138 degrees with respect to a vertical plane extending through said second rod segment, whereby said rod exerts pressure upwardly against the forearm and reduces pressure on the wrist of the fisherman, responsive to pressure applied to the fishing rod by a fish and retrieved lures.

2. The arm support of claim 1 comprising a bore or cavity longitudinally disposed in the handle of the fishing rod for receiving said rod.

3. The arm support of claim 1 comprising rod threads provided on said straight rod portion and cavity threads disposed in a cavity disposed in said handle, whereby said cavity receives said straight rod portion and said rod threads engage said cavity threads to removably secure said straight rod portion in said cavity.

4. The arm support of claim 1 comprising coupling means carried by said straight rod portion, coupling threads disposed in said coupling means, nipple means extending from said handle and nipple threads provided on said nipple means, whereby a cavity disposed in said handle receives said straight rod portion and said coupling means threadably engages said nipple means, with said coupling threads threadably engaging said nipple threads for removably securing said arm support on the handle of the fishing rod.

5. The arm support of claim 1 wherein said straight rod portion comprises a distal section, a middle section continuous with said distal section and disposed upwardly at an angle of from about 143 to about 163 degrees with respect to the longitudinal horizontal axis of said distal section and a proximal section continuous with said middle section and located adjacent to said curved rod portion and disposed downwardly at an angle of from about 150 to about 170 degrees with respect to the longitudinal axis of said middle section; and wherein said curved rod portion comprises a first rod segment carried by said proximal section and substantially colinear with respect to the longitudinal axis of said proximal section and disposed at an angle of from about 110 to about 130 degrees with respect to a vertical plane extending through the longitudinal axis of said straight rod portion, a second rod segment extending from said first rod segment and disposed upwardly at an angle of from about 167 to about 187 degrees with respect to the longitudinal axis of said first rod segment and disposed at an angle of from about 116 to about 136 degrees with respect to a vertical plane extending through the longitudinal axis of said first rod segment, a third rod segment carried by said second rod segment and disposed downwardly at an angle of from about 164 to about 184 degrees with respect to the longitudinal axis of said second rod segment and disposed at an angle of from about 118 to about 138 degrees with respect to a vertical plane extending through the longitudinal axis of said second rod segment and a terminal distal end carried by said third rod segment and disposed at an angle of from about 155 to about 175 degrees upwardly with respect to the longitudinal axis of said third rod segment and having a vertical plane substantially coplanar with respect to a vertical plane extending through the longitudinal axis of said third rod segment.

6. The arm support of claim 5 comprising a bore or cavity disposed in the handle of the fishing rod for receiving said straight rod portion of said arm support.

7. The arm support of claim 6 comprising rod threads carried by said straight rod portion and cavity threads disposed in said cavity, whereby said cavity receives said straight rod portion and said rod threads engage said cavity threads to removably secure said straight rod portion in said cavity.

8. The arm support of claim 6 comprising coupling means carried by said straight rod portion, coupling threads disposed in said coupling means, nipple means extending from said handle and nipple threads provided on said nipple means, whereby said cavity means receives said straight rod portion and said coupling means engages said nipple means, with said coupling threads threadably engaging said nipple threads for removably securing said arm support on the handle of the fishing rod.

9. An arm support for stabilizing a fishing rod having a handle, a reel mounted on the handle and a fishing line wound on the reel, said arm support disposed for engaging a fisherman's arm and preventing the wrist of the fisherman from becoming fatigued when lures are retrieved and fish are caught on the fishing line and comprising an elongated rod having a straight rod portion comprising a terminal distal section, a middle section continuous with said terminal distal section and disposed upwardly at an angle of about 153 degrees with respect to the longitudinal axis of said distal section and a proximal section continuous with said middle section and disposed downwardly at an angle of about 160 degrees with respect to the longitudinal axis of said middle section; a curved rod portion comprising a first rod segment continuous with said proximal section and substantially colinear with respect to the longitudinal axis of said proximal section and disposed at an angle of about 120 degrees with respect to a vertical plane extending through the longitudinal axis of said straight rod portion, a second rod segment continuous with said first rod segment and disposed upwardly at an angle of about 177 degrees with respect to the longitudinal axis of said first rod segment and disposed at an angle of about 126 degrees with respect to a vertical plane extending through the longitudinal axis of said first rod segment, a third rod segment continuous with said second rod segment and disposed downwardly at an angle of about 174 degrees with respect to the longitudinal axis of said second rod segment and disposed at an angle of about 128 degrees with respect to a vertical plane extending through the longitudinal axis of said second rod segment and a distal end continuous with said third rod segment and disposed upwardly at an angle of about 165 degrees with respect to the longitudinal axis of said third rod segment and having a vertical longitudinal plane substantially coplanar with respect to the vertical longitudinal plane of said third rod segment; and an elongated cavity centrally longitudinally disposed in the handle of the fishing rod for receiving said distal section of said straight rod portion.

10. The arm support of claim 9 wherein said distal section of said straight rod portion is fixedly mounted in said cavity.

11. The arm support of claim 9 comprising rod threads provided on said straight rod portion and cavity threads disposed in said cavity, whereby said cavity receives said straight rod portion and said rod threads engage said cavity threads to removably secure said straight rod portion in said cavity.

12. The arm support of claim 9 comprising coupling means carried by said straight rod portion, coupling threads disposed in said coupling means, nipple means extending from said handle and nipple threads provided on said nipple means, whereby said cavity means receives said straight rod portion and said coupling means 13. An arm support for stabilizing a fishing rod, comprising rod means having an elongated straight rod portion and a curved rod portion extending from said straight rod portion, a reel seat shaped in said straight rod portion for receiving and mounting a reel on said straight rod portion and threaded connecting means provided on said straight rod portion for attaching said straight rod portion to the fishing rod, said curved rod portion comprising a first rod segment extending from said straight rod portion and disposed at an angle from about 110 to about 130 degrees with respect to a vertical plane extending longitudinally through said straight rod portion, a second rod segment extending from said first rod segment and disposed at an angle of from about 116 to about 136 degrees with respect to a vertical plane extending longitudinally through said first rod segment and a third rod segment extending from said second rod segment and disposed at an angle of from about 118 to about 138 degrees with respect to a vertical plane extending through said second rod segment, whereby said curved rod portion of said arm support engages the forearm of a fisherman when said straight rod portion receives the fishing rod by operation of said connecting means and the reel is mounted in said reel seat and said arm support relieves pressure applied to the wrist of the fisherman responsive to playing a fish and retrieving lures.

14. The arm support of claim 13 comprising a finger grip extending from said reel seat for gripping by the fisherman.

* * * * *